United States Patent [19]
Barrett

[11] 4,292,066
[45] Sep. 29, 1981

[54] MATERIAL FEEDER

[76] Inventor: Melvin L. Barrett, P.O. Box 1492, Henderson, N.C. 27536

[21] Appl. No.: 158,350

[22] Filed: Jun. 10, 1980

[51] Int. Cl.³ .............................................. C03B 3/00
[52] U.S. Cl. ...................................... 65/335; 65/134; 414/154; 414/158; 414/165
[58] Field of Search ................ 65/134, 135, 136, 335; 414/165, 164, 150, 154, 158, 166

[56] References Cited
U.S. PATENT DOCUMENTS

| | | | |
|---|---|---|---|
| 3,074,568 | 1/1963 | Mambourg et al. | 65/335X |
| 3,167,191 | 1/1965 | Zellers, Jr. | 414/166 |
| 4,036,625 | 7/1977 | Holmes et al. | 65/134 |

Primary Examiner—Arthur D. Kellogg
Attorney, Agent, or Firm—Harvey B. Jacobson

[57] ABSTRACT

A pair of spaced opposing upstanding surfaces are provided and an inclined upwardly facing ramp surface extends therebetween and includes a lower marginal edge. A partial cylindrical wall extends axially between the upstanding surfaces and opens in a generally horizontal direction between and paralleling the upstanding surfaces. The partial cylindrical wall includes an upper marginal edge portion registered with the lower marginal edge of the inclined ramp surface and a generally radially partitioned feed wheel is journaled between the upstanding surfaces and has one side thereof closely embraced by the partial cylindrical wall. Drive structure drivingly rotates the wheel in a direction to move the upper radial partitions thereof in the general direction in which the partial cylindrical wall opens and a gravity discharge outlet is spaced above the wheel and the area between the upstanding surfaces above the lower portion of the inclined ramp surface. The gravity discharge outlet is shiftable, relative to the wheel ramp surface, in a horizontal direction paralleling the direction in which the partial cylindrical wall opens, and includes a vertically adjustable gate extending across the side of the discharge outlet facing in the direction in which the partial cylindrical wall opens movable toward and away from the upper periphery of the wheel.

6 Claims, 6 Drawing Figures

MATERIAL FEEDER

BACKGROUND OF THE INVENTION

When glass fibers are being produced for use in manufacturing air filter pads and the like, used and broken glass is fed into a furnace from which streams of molten glass are gravity discharged toward the periphery of a horizontal drum upon which the cooling glass fibers are wound. In most installations, the furnace is manually fed, but manual feeding of glass by even skilled workman sometimes result in glass being fed into the furnaces too fast with the result that the temperature of the molten glass therein is reduced below the flow temperature and the gravity discharge of streams of molten glass toward the drum periphery is interrupted. Accordingly, a need exists for an apparatus by which used and broken glass may be fed to the furnaces at controlled rates.

Various types of feed mechanisms including some of the general structural and operational features of the instant invention are disclosed in U.S. Pat. Nos. 1,382,371, 1,785,585, 1,822,705, 2,829,784 and 3,167,191. However, these previously known forms of material feeding structures are not well suited for feeding broken used glass to glass furnaces used in the production of glass fibers.

BRIEF DESCRIPTION OF THE INVENTION

The feeder of the instant invention has been specifically designed for use in feeding used and broken glass to furnaces utilized in the manufacture of glass fibers. However, the feeder includes certain features thereof which also render the feeder highly desirable for feeding materials other than used and broken glass.

The feeder includes a driven radially partitioned feed wheel and an abutment adjustable generally radially of the feed wheel as well as a feed hopper disposed above the feed wheel and horizontally adjustable relative to the latter transversely of the axis of rotation of the feed wheel. The hopper is adjustable relative to an inclined ramp which is operational to direct used and broken glass toward the feed wheel and the motor utilized to drive the feed wheel is of the variable speed type. Accordingly, adjustments in the positioning of the hopper and the speed of rotation of the feed wheel are possible in order to tailor the feed rate of the feeder as desired and in accordance with the types of glass being fed to the furnace.

The main object of this invention is to provide a material feed structure which will be operative to variably feed broken used glass into a furnace utilized in the manufacture of glass fibers.

Another object of this invention is to provide a feeder whose operational features also adapt it for controlled feeding of materials other than broken used glass.

Still another object of this invention is to provide a feeder construction whose structural features allow the feeder to be adapted for use in conjunction with different types of glass.

Another important object of this invention is to provide a feeder which may be operated efficiently by semi-skilled labor.

A final object of this invention to be specifically enumerated herein is to provide a material feeder in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
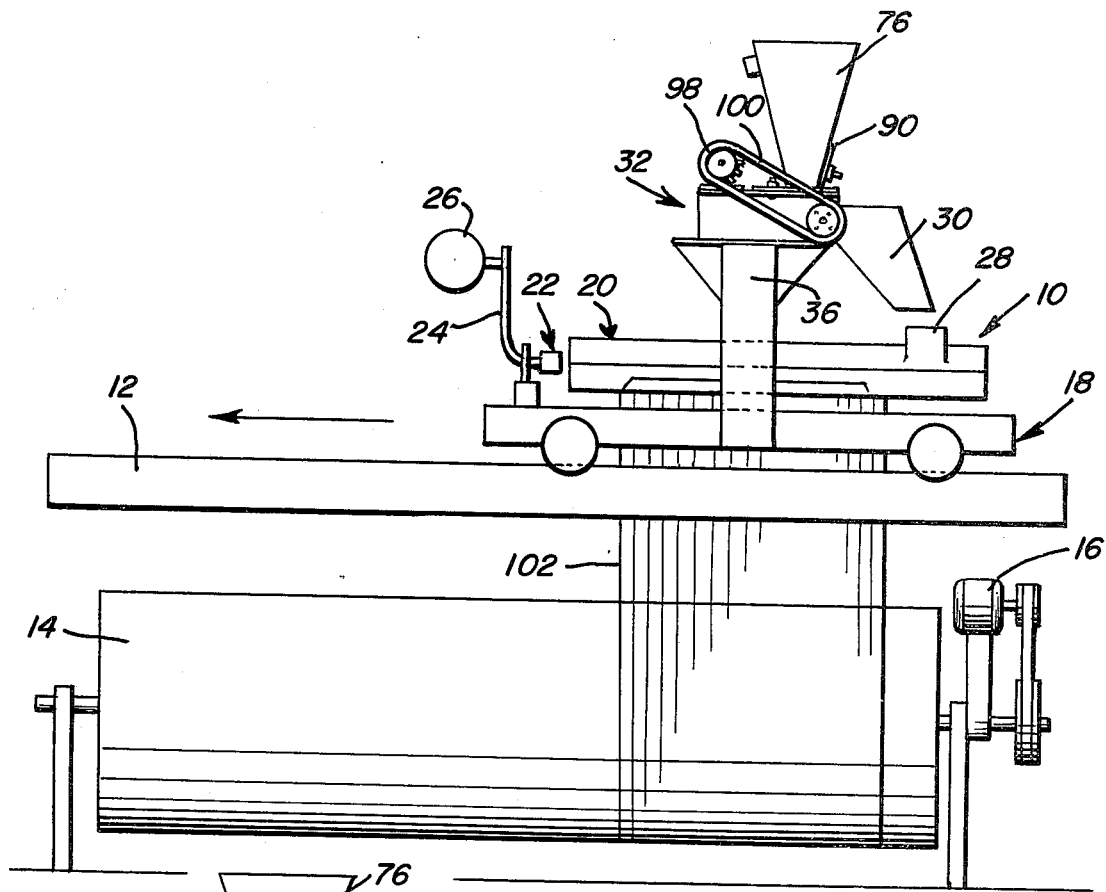
FIG. 1 is a side elevational view of a typical glass fiber manufacturing station wherein the material feeder of the instant invention is utilized to break up and to feed used and broken glass to a glass furnace for the production of glass fibers.
Figure 2:
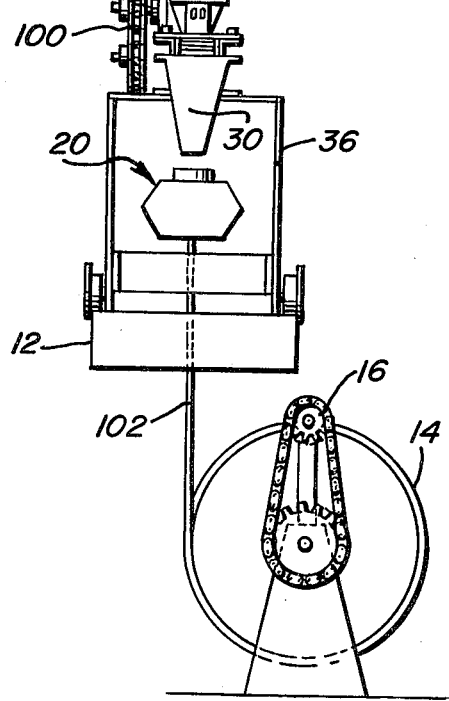
FIG. 2 is an end elevational view of the assemblage illustrated in FIG. 1.
Figure 5:
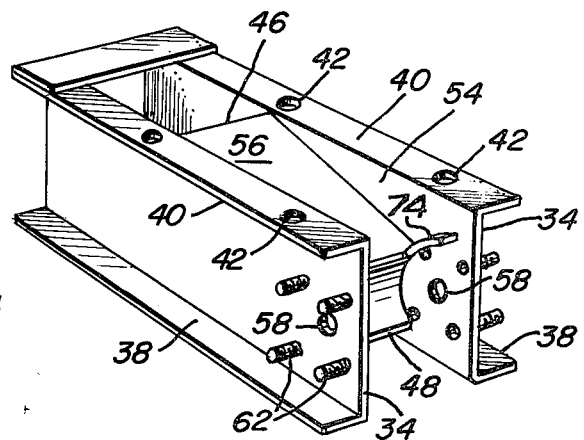
FIG. 5 is a fragmentary perspective view of the body portion of the material feed structure.

Referring now more specifically to the drawings, the numeral 10 generally designates a glass fiber producing apparatus. The apparatus 10 includes an elevated track 12 spaced above and extending along a rotary winding drum 14 driven by a variable speed motor 16. The track 12 supports a carriage referred to in general by the reference numeral 18 therefrom for movement along the track and the carriage 18 supports a furnace referred to in general by the reference numeral 20 with which a burner 22 is operatively associated, the burner 22 being supplied fluent fuel through a supply line 24 24 including a pressure gauge 26, a flexible fluent fuel delivery line (not shown) being operatively connected to the supply line 24.

The furnace 20 includes an inlet opening 28 into which broken used glass is discharged from a chute 30 and, conventionally, the chute 30 is supplied broken and used glass manually. It is to be noted that the above foregoing description of the apparatus 10 is conventional structure and is not to be considered as a part of the instant invention other than the feeder of the instant invention being used in conjunction therewith.

The feeder of the instant invention is referred to in general by the reference numeral 32 and includes a pair of opposing horizontal channel members 34 supported atop a support 36 carried by the carriage 18. The channel members 34 include oppositely directed lower flanges 38 mounted on the support 36 in any convenient manner and upper flanges 40 having longitudinally spaced bores 42 formed therein. An inclined ramp 46 extends and is secured between the channel members 34 as well as a horizontally opening partial cylindrical wall 48. The partial cylindrical wall 48 includes an upper marginal edge portion 50 which is registered with the lower marginal edge portion 52 of the ramp 46.

The channel members 34 define opposing upstanding surfaces 54 between which the ramp 46 extends and the ramp 46 defines an inclined upper surface 56. The ramp 46 is inclined downwardly toward a first pair of corresponding ends of the channel members 34 between which the partial cylindrical wall 48 opens and the first ends of the channel members 34 include registered bores 58 formed therein through which the opposite ends of the shaft 60 are received. A plurality of outwardly projecting threaded mounting studs 62 are carried by each channel member 34 about the corresponding bore 58 and bearing assemblies 64 journaling the opposite ends of the shaft 60 are mounted to the remote surfaces of the channel members 34 through the utilization of the studs 62 and threaded fasteners 66.

A radially partitioned wheel 68 is mounted on the shaft 60 between the channel members 34 and the wheel 68 includes circular opposite end plates 70 between which generally radial vanes 72 are secured. The vanes 72 are anchored to the shaft 60 and extend generally radially thereof. Further, the vanes 72 are spaced equally about the shaft 60.

The studs 62 are secured in suitable bores formed in the channel members 34 and the inner ends of the studs 62 are ground flush with the opposing inner surfaces 54 of the channel members 34. In addition, the partial cylindrical wall or plate 48 closely embraces the opposing side of the wheel 68 with minimum clearance between the wall 48 and the opposing surfaces of the wheel 68. Also, arcuate opposite side flanges 74 are carried by the channel members 34 and form opposite end continuations of the partial cylindrical wall 48. The flanges 74 overlie those upper portions of the wheel 68 which are not closely embraced by the partial cylindrical wall 48 and the feeder 32 is operatively associated with the chute 30 for discharging the material handled by the feeder 32 into the chute 30.

A downwardly tapering and upwardly opening gravity discharge hopper 76 is provided with opposite side front to rear extending mounting flanges 78 at its lower discharge end and the flanges 78 include longitudinally spaced elongated and longitudinally extending slots 80 formed therein. The flanges 78 abut and are slidably positionable along the upper surfaces of the flanges 40 and suitable threaded fasteners 82 are secured through the bores 42 and the slots 80 for releasably retaining the hopper 76 in adjusted shifted positions along the upper flanges 40.

The hopper 76 includes a front wall 84 having a downwardly opening concave lower marginal edge 86 and the front wall 84 supports a pair of outstanding threaded studs 88 from which a vertically shiftable abutment plate 90 having a pair of vertical slots 92 formed therein is supported. The studs 88 are slidingly received in the slots 92 and threaded fasteners 94 are utilized to releasably secure the plate 90 in adjusted shifted position along the exterior of the front wall 84 of the hopper 76. The lower marginal edge of the plate 90 is curved outwardly as at 95 to reduce the tendency of material being fed by the wheel 68 jamming between the plate 90 and the wheel 68.

Figure 3:
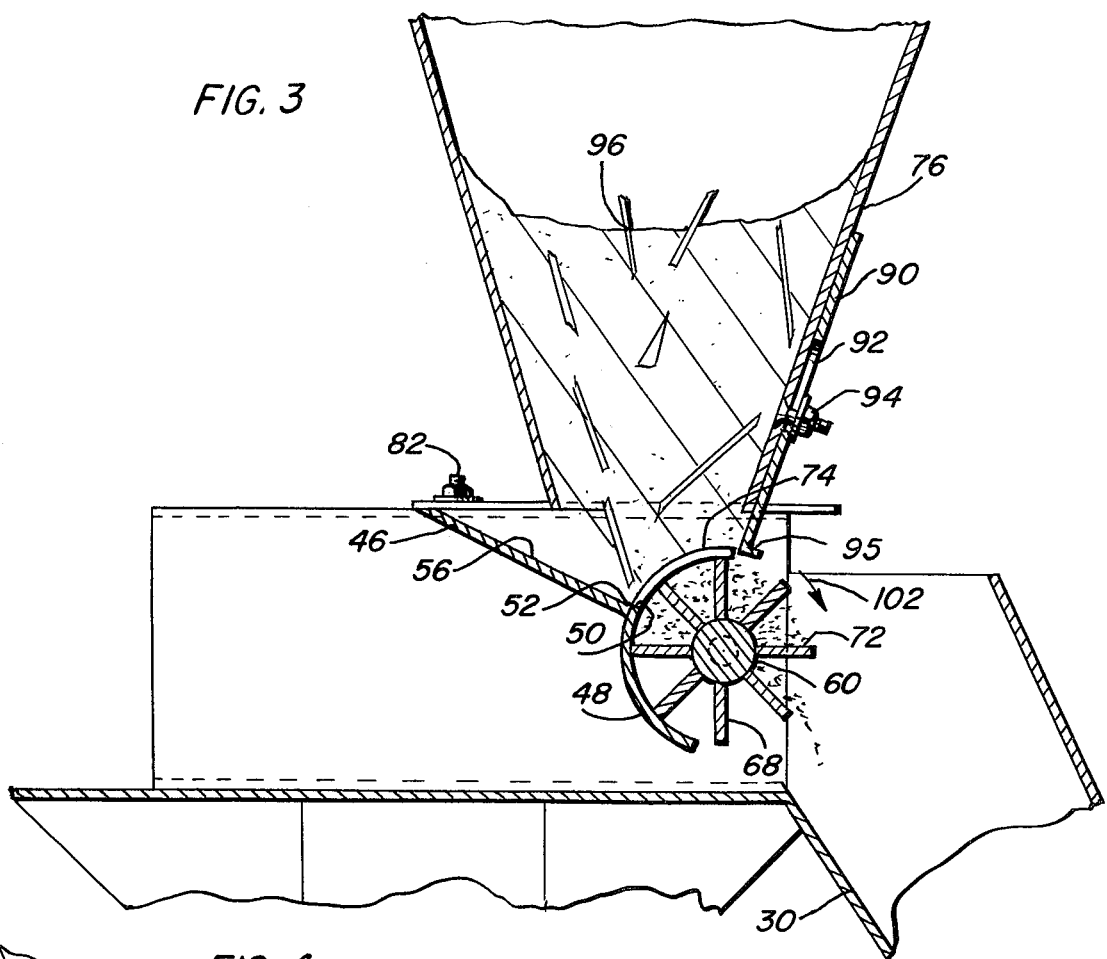
FIG. 3 is an enlarged fragmentary vertical sectional view taken substantially upon a plane passing through the center of the material feed structure of the instant invention.
Figure 4:
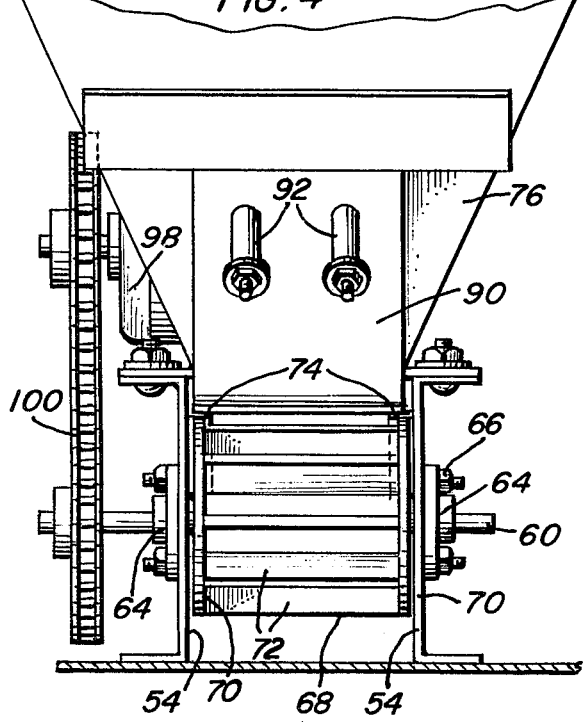
FIG. 4 is an end elevational view of the assemblage illustrated in FIG. 3 and as seen from the right side of FIG. 3.
Figure 6:
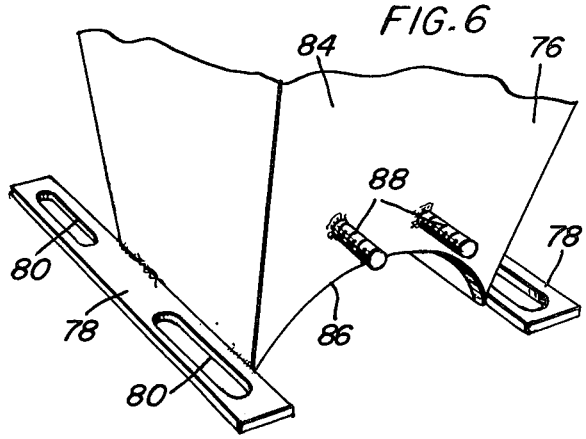
FIG. 6 is a fragmentary enlarged perspective view of the lower portion of the hopper component of the material feed structure.

In operation, used and broken glass 96 may be manually fed into the hopper 76 in the same manner in which it was previously manually fed into the chute 30. However, the glass 96 fed into the hopper 76 is retained therein and discharged therefrom at a controlled rate through the utilization of the wheel 68. The plate 90 is adjusted according to the type of glass 96 which will be placed in the hopper 76 and the front to rear positioning of the hopper 76 along the flanges 40 may also be adjusted. Thereafter, a variable speed electric motor 98 drivingly connected to the shaft 60 through an endless chain 100 is actuated at the desired speed in order to rotate the wheel 68 in the direction indicated by the arrow 102 in FIG. 3. The flanges 74 prevent glass being discharged from the hopper 76 from wedging between the end plates 70 and the surfaces 54 and the inclined surface 56 of the ramp 46 enables fore and aft shifting of the hopper 76 relative to the channel members 34. In addition, any larger pieces of glass 86 which tend to be kicked out of engagement with the wheel 68 may move rearwardly up the ramp 46 and again move slowly downwardly therealong into engagement with the wheel 68. The adjustability of the plate 90 serves to tailor the feeder 32 to the type of glass 96 being fed to the hopper 76 and the fore and aft shifting of the hopper 76 relative to the channel members 34 also serves to adjust the feeder 32 to the type of glass 96 being placed within the hopper 76.

By driving the wheel 68 through the utilization of the variable speed motor 98, proper controlled discharged of finally broken up glass may be made to the upper end of the chute 30 and into the furnace 20 whereby the temperature of the glass within the furnace is not allowed to drop below the desired flow temperature. Thus, the streams 102 of glass being discharged downwardly toward the periphery of the drum 14 are not interrupted and the manufacturing process for producing glass fibers is maintained continuous. As the glass fibers are wound on the drum 14, the carriage 18 moves back and forth along the track 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A material feed structure including body means defining a pair of spaced opposing upstanding surfaces, ramp means defining an inclined ramp surface extending between said upstanding surfaces and including a lower marginal edge, a partial cylindrical wall extending axially between said upstanding surfaces and opening in a generally horizontal direction between and paralleling said upstanding surfaces, said partial cylindrical wall including an upper marginal portion registered with the lower marginal edge of said inclined ramp surface, a generally radially partitioned feed wheel journaled between said upstanding surfaces and having one side thereof closely embraced by said partial cylindrical wall, drive means drivingly connected to said feed wheel for driving the latter in a direction to move the upper radial partitions thereof in the general direction in which said partial cylindrical wall opens, a gravity discharge outlet spaced above said wheel and the area between said upstanding surfaces above the lower portion of said inclined ramp surface, said gravity discharge outlet including a vertically adjustable abutment plate slidingly received and extending between said upstanding surfaces on the side of said outlet facing in the direction in which said partial cylindrical wall opens, and adjustable toward and away from the outer periphery of said wheel, means supporting said gravity discharge outlet in position relative to said upstanding surfaces, ramp and wheel for back and forth adjustable shifting of said gravity discharge outlet along a path generally paralleling the direction in which said partial cylindrical wall opens and transversely of the axis of rotation of said feed wheel.

2. The combination of claim 1 wherein said upstanding surfaces include arcuate flanges supported therefrom and projecting outwardly from said upstanding surfaces toward each other, said arcuate flanges forming coextensive extensions of the opposite ends of said partial cylindrical wall.

3. The combination of claim 1 wherein said abutment plate includes a lower marginal edge which generally parallels the axis of rotation of said wheel, said lower marginal edge being curved outwardly in the direction in which said partial cylindrical wall opens.

4. The combination of claim 1 wherein said gravity discharge outlet includes a transverse wall extending between said upstanding surfaces and defining the forward extremity of said gravity discharge outlet facing in the direction in which said partial cylindrical wall opens, said transverse wall including a downwardly opening arcuate lower marginal edge portion, said abutment plate being supported from the outer surface of said transverse wall and variably registering with said arcuate lower marginal edge.

5. The combination of claim 4 wherein said abutment plate includes a lower marginal edge which generally parallels the axis of rotation of said wheel, said lower marginal edge being curved outwardly in the direction in which said partial cylindrical wall opens.

6. The combination of claim 5 wherein said upstanding surfaces include arcuate flanges supported therefrom and projecting outwardly from said upstanding surfaces toward each other, said arcuate flanges forming coextensive extensions of the opposite ends of said partial cylindrical wall.

* * * * *